Aug. 5, 1947.  E. SCHMIDT  2,425,128
DISCONNECTABLE MEANS OF ATTACHMENT FOR THE COVERS OF HOLLOW BODIES
Filed Oct. 14, 1943
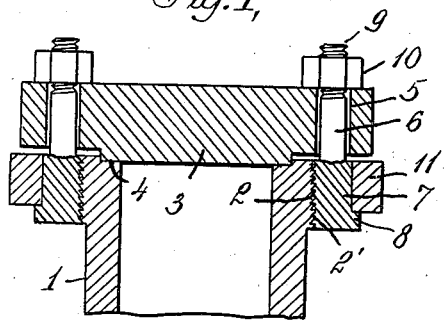
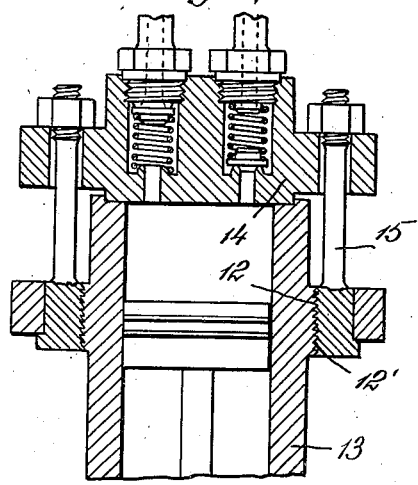
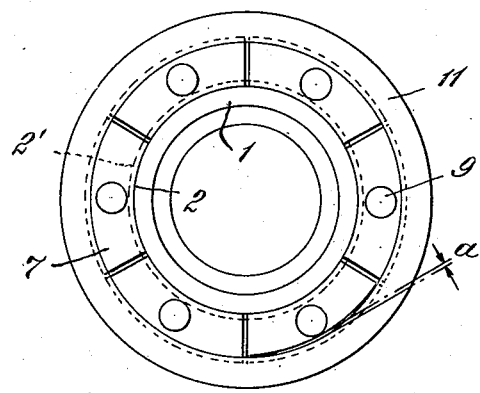
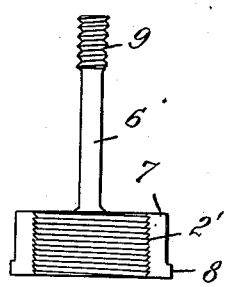
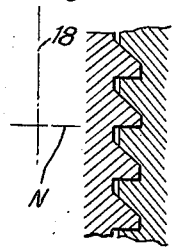
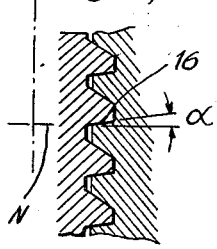
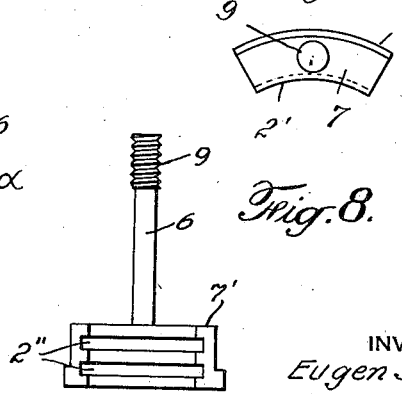
INVENTOR
Eugen Schmidt
BY
ATTORNEYS Patented Aug. 5, 1947

2,425,128

UNITED STATES PATENT OFFICE 2,425,128

DISCONNECTABLE MEANS OF ATTACHMENT FOR THE COVERS OF HOLLOW BODIES

Eugen Schmidt, Winterthur, Switzerland, assignor to Sulzer Freres, Societe Anonyme, Winterthur, Switzerland Application October 14, 1943, Serial No. 506,222
In Switzerland May 31, 1943

7 Claims. (Cl. 220—55)

The invention relates to apparatus for removably connecting covers to hollow bodies subjected to high pressure. The invention consists in the improvement which comprises a grooved exterior area on the hollow body, a plurality of tie-bolts for securing the cover to the hollow body, each tie-bolt having at one end a segment with an outside bearing surface and an inner grooved surface, said tie-bolts being arranged exteriorly of the hollow body, with the grooves in engagement with the grooves on the hollow body and a ring encircling the segments and in engagement with the bearing surfaces of the segments to secure the segments in engagement with the hollow body.

Hollow bodies which are subjected to a high internal pressure above atmospheric and are in wide use in the form of containers, cylinders and so forth, for example in the chemical industry, are provided with thick walls for the purpose of keeping the stressing of the material within the limits of admissibility. The bolts serving to hold the covers firm may not be placed in the neighbourhood of the sealing surface, as is expedient from the point of view of strength technique and customary in the construction of low-pressure apparatus. The reason for this is that the bolt holes would give rise to increased stresses in excess of admissible figures in the already highly stressed cover zones of such hollow bodies. As is known, this disadvantage is counteracted by providing the hollow body at the end near the cover with a large flange which allows the cover bolts to be placed more to the outside. Such flanges render the forged piece considerably more expensive and impair the material structure in the zone of the flange as a result of the accumulation of mass. A completely effective tempering of the alloyed steel most commonly chosen for such hollow bodies is, moreover, impossible.

According to a known proposal for avoiding the use of flanges for cover attachment, the cover is set far into the cylinder bore and a packing ring, wedge-shaped in cross-section, is let into the jacket of the cover. On the side of the cover at which the pressure is lower, a ring consisting of several parts is placed in a groove running around the cylinder wall. The forces acting upon the cover as a result of the internal pressure cause the wedge-shaped packing ring to exert a pressure in a radial direction upon the cylinder wall and thus provide a good sealing effect. Disadvantages of this proposal are to be found in the difficulty of dismantling the packing ring and in an additional stressing of the cylinder end by the pressure of the packing ring acting in a radial direction.

Further, this solution demands an additional lengthening of the end of the cylinder in order to house the rather thick sealing cover.

In another known solution the cover end of a hollow body is provided on its outside with a thread upon which a cap-nut having an internal thread is screwed, and the sealing effect is obtained by a packing plate arranged between the hollow body and the cap-nut. This joint can only be used for high-pressure apparatus of small dimensions, because the forces required in order to obtain sufficiently great sealing pressure produce thread friction which it is very difficult to eliminate.

A known means of attaching covers to hollow bodies, flexible in action and fulfilling the requirements of high-pressure construction, has on the outer wall of the hollow body a thread upon which a flange ring is screwed, the screw bolts for the cover being set in this ring. In order that the forces arising from the internal pressure and acting upon the cover may be uniformly transmitted to the whole circumference of the wall of the hollow body, it is necessary to give the screwed-on flange a considerable thickness, with the result that this attachment entails high costs of production. In order to bring the heads of the bolts near the hollow body, it is necessary to arrange the shafts of the bolts at a corresponding distance from the flange thread, and this entails a correspondingly increased thickness of the bolt flange, again with the result that a difficult and expensive design is required. The shortcomings of the known proposals can be avoided by means of the present invention.

Examples of execution of the subject matter of the invention are illustrated in the drawings.

Fig. 1 shows an axial section of a first form of execution,

Fig. 2 a top view of the same with cylinder cover removed,

Fig. 3 an axial section of a second form of execution.

Fig. 4 a detail in side elevation and

Fig. 5 a top view of the same detail.

Figs. 6 and 7 each show a thread or groove profile of the tie-bolt directly engaging the hollow body.

Fig. 8 is a further detail in side elevation.

In Fig. 1 the wall 1 of any hollow body for high internal pressure is provided at its cover end with an external thread 2. The cover 3 is placed upon the hollow body in such a way that the two sealing and fitting faces 4 lie against each other. In cover 3 holes 5 are provided, through which pass the tie-bolt shafts 6. These shafts 6 have at their lower end a ring segment 7 with a supporting edge 8. At the opposite end the tie-bolt is equipped with a screw thread 9 upon which the nut 10 is fitted. The segment surface turned towards thread 2 and of the same radius of curvature has a corresponding thread 2'. Against the segments 7 which engage with the screw-thread 2 a closed ring 11, which lies upon the supporting edge 8, is placed, it being expedient for the ring to be pressed on when cold or heated and shrunk on. In this way it is possible to obtain a uniform distribution of forces from shaft 6 over the separate threads of segment 7. After the segments 7 have, in the manner described, been brought into direct engagement with thread 2 on the outer wall of the hollow body and are held by ring 11, the nuts 10 are drawn-up, and in this way cover 3 is made tight against the hollow body 1.

A particularly expedient manner of manufacturing tie-bolts as shown in Figs. 4 and 5 consists in the employment of a bush having a height equal to that of the tie-bolt, an internal diameter equal to that of the full diameter of the external thread 2 and a wall thickness somewhat greater than the diameter of shaft 6. A bush of these dimensions is provided at a height corresponding to the height of the segment with an internal thread, which corresponds in its characteristics to thread 2. A good fit of the internal and the external threads can be obtained if the two threads 2 and 2' are cut and ground on the same machine and with the same tools. Thereupon the supporting edge 8 is machined on the threaded bush. Next, the number of segments, corresponding to the required number of bolts for fastening the cover, are cut out from the bush and are further worked up into the form of screw bolts.

It is particularly advantageous in the case of varying pressure stresses for the transition from bolts shafts 6 to segments 7 to be rounded off, in order to preclude the danger of fatigue fractures at such points. When stressing is steady, it is possible to produce and machine the screw bolts and segments as separate pieces and then to join them by welding, a method which offers simplification and saving in production costs.

In Fig. 3 a means of attachment for the cover of a high-pressure cylinder is shown in which special attention has been paid to the requirement of great expansibility. For this purpose the external thread 12 has been moved along the cylinder wall 13 away from the end of the cylinder near the cover. For the attachment of cylinder cover 14 to cylinder 13, identical conditions being assumed, longer tie-bolts 15 are necessary than in the example of execution shown in Fig. 1. The design of the tie-bolt and its application are, apart from the greater length of the shaft, the same as in the example of execution first described.

In order to guarantee that the forces to be transmitted are distributed uniformly over the whole engaging surface of the segment thread 2' or 12', the cross-section of segment 7 can be reduced by an amount $a$ (Fig. 2) in the zone where the force passes into the bolt shaft 6. In this way a marked elongation takes place at this point, so that the flux of force is distributed uniformly over the whole length of the segment thread and thus over the wall of the hollow body. In such cover attachments the durability of the highly stressed threads of nuts, bolts, segments and containers can be increased by surface compression of the thread flanks, for example by a process of rolling.

According to the conditions to be fulfilled in service, it may be expedient in certain cases to provide, at the point where the force passes from the tie-bolts to the wall of the hollow body, a force which acts inwards in a radial direction and opposite to the internal pressure. The magnitude of this force is determined by a suitable choice of the profile angle $\alpha$ in the groove. According to Fig. 6 this is the angle of inclination which is enclosed between the pressing surface 16 and the normal plane N to the axis 18 of the tie-bolts 6 or 15. In cases where it is possible to do without this radially directed force, it is possible to adopt a profile according to Fig. 7, in which the pressing surface 17 of the grooves lies in the normal plane N to the axis 18 of the tie-bolts 6 or 15.

While retaining the essentials of the present invention, it is possible as shown in Fig. 8 to replace the screw thread serving as an engaging surface by continuous or broken annular grooves 2'' which are arranged approximately in the normal plane to the axis of the shaft 6, and of any suitable groove profile, on the tie-bolt segments and on the external wall of the hollow body.

I claim:

1. In apparatus for removably connecting a cover to the open tubular end of a hollow body subjected to high pressure, the improvement which comprises a threaded exterior area on the tubular part of the hollow body, a plurality of tie-bolts for securing the cover to the hollow body, each tie-bolt having at one end a segment with an outside bearing surface and an inner threaded surface which cooperatively engages the threads on the tubular part, the plurality of the tie-bolts being arranged exteriorly of the hollow body, and a ring encircling the segments and in engagement with the bearing surfaces of the segments to secure the segments in engagement with the tubular part.

2. In apparatus for removably connecting a cover to the open tubular end of a hollow body subjected to high pressure, the improvement which comprises a transversely grooved exterior area on the tubular part of the hollow body, a plurality of tie-bolts for securing the cover to the hollow body, each tie-bolt having at one end a segment with an outside bearing surface and an inner grooved surface, said tie-bolts being arranged exteriorly of the hollow body with their grooved inner surfaces in interlocking engagement with the grooved exterior area on the tubular part and a ring encircling the segments and in engagement with the bearing surfaces of the segments to secure the segments in engagement with the tubular part.

3. Apparatus as claimed in claim 2. in which the grooves are formed as screw threads.

4. Apparatus according to claim 2, in which the grooves on the segments have their surfaces which are pressed into engagement with the grooves on the tubular part inclined to the normal plane through the axis of the tie-bolts so that forces acting radially and inwardly on the tubular part are produced by forces acting on the tie-bolts in the longitudinal direction of the bolts.

5. Apparatus according to claim 2, in which the grooves on the exterior of the hollow body and on the segments have mutually engaging surfaces lying in a normal plane to the axis of the tie-bolts.

6. Apparatus according to claim 2 in which the cross-section of the segments in the radial direction is less in the portion adjacent to the tie-bolt proper than at the ends.

7. Apparatus according to claim 2 in which the grooved exterior areas on the tubular part of the hollow body include a multiplicity of annular grooves, and the inner grooved surface of the segments includes a multiplicity of corresponding grooves.

EUGEN SCHMIDT.

REFERENCES CITED

The following references are of record in the file of this patent:

UNITED STATES PATENTS

| Number | Name | Date |
|---|---|---|
| 2,326,176 | Schierenbeck | Apr. 10, 1943 |
| 623,208 | Foltz | Apr. 18, 1899 |
| 2,079,769 | McAbee | May 11, 1937 |
| 2,226,495 | Jacocks | Dec. 24, 1940 |
| 2,213,161 | Ericsson | Aug. 27, 1940 |
| 1,593,041 | Stewart | July 20, 1926 |

FOREIGN PATENTS

| Number | Country | Date |
|---|---|---|
| 223,335 | Great Britain | Oct. 23, 1924 |